US008142085B2

United States Patent
Hasegawa

(10) Patent No.: US 8,142,085 B2
(45) Date of Patent: Mar. 27, 2012

(54) APERTURE UNIT AND LENS BARREL INCLUDING THE SAME

(75) Inventor: Tomoki Hasegawa, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/904,973

(22) Filed: Oct. 14, 2010

(65) Prior Publication Data

US 2011/0091198 A1    Apr. 21, 2011

(30) Foreign Application Priority Data

Oct. 20, 2009   (JP) .................. 2009-241133

(51) Int. Cl.
G03B 9/02   (2006.01)

(52) U.S. Cl. ........ 396/505; 396/463; 396/483; 396/484; 396/485; 396/490

(58) Field of Classification Search .................. 396/450, 396/483–485, 487, 505, 507, 463, 486, 490
See application file for complete search history.

(56) References Cited

U.S. PATENT DOCUMENTS 4,797,700 A * 1/1989 Tsuji et al. .................... 396/508
6,340,252 B1 * 1/2002 Kawano ......................... 396/450
6,866,431 B2 * 3/2005 Namazue et al. ............. 396/450
2004/0240879 A1 * 12/2004 Negishi et al. ................ 396/505

FOREIGN PATENT DOCUMENTS

JP   6-003520 B2   1/1994
JP   10-301159 A   11/1998

* cited by examiner

Primary Examiner — Clayton E Laballe
Assistant Examiner — Warren Fenwick
(74) Attorney, Agent, or Firm — Canon U.S.A., Inc. IP Division

(57) ABSTRACT

An aperture unit includes three or more diaphragm blades, a base plate that supports the diaphragm blades, a drive lever connected to the diaphragm blades, and an aperture motor that rotates the drive lever, wherein, in a range from a reference aperture value to a specific aperture value, a polygonal aperture is formed by aperture edges of two or more of the three or more diaphragm blades that linearly move in a first direction and an aperture edge of at least one of the three or more diaphragm blades that linearly moves in a second direction opposite to the first direction, and wherein, in a range from the specific aperture value to a closed aperture state, an aperture is formed by aperture edges of two diaphragm blades that move in opposite directions.

6 Claims, 11 Drawing Sheets

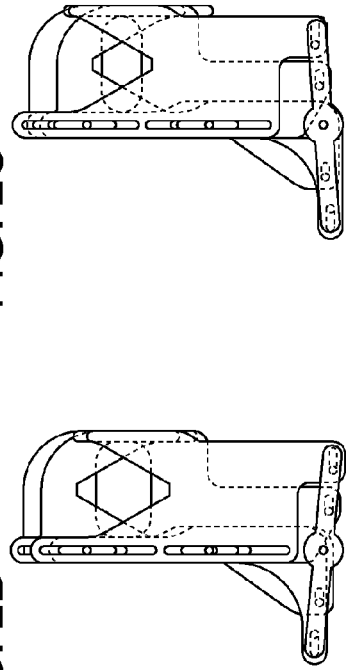
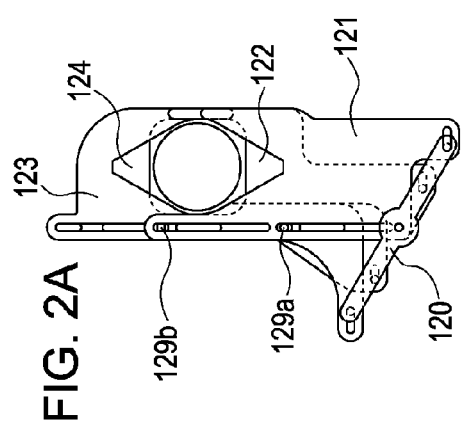
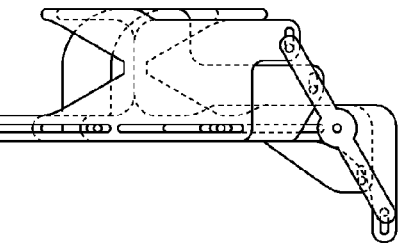

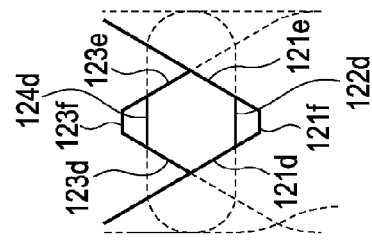
FIG. 3A
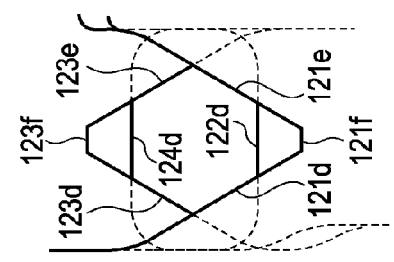
FIG. 3B
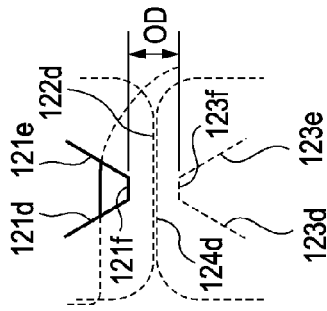
FIG. 3C
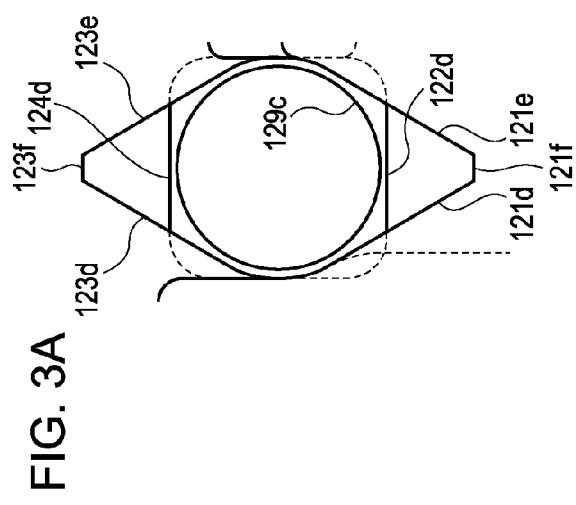
FIG. 3D
FIG. 3E
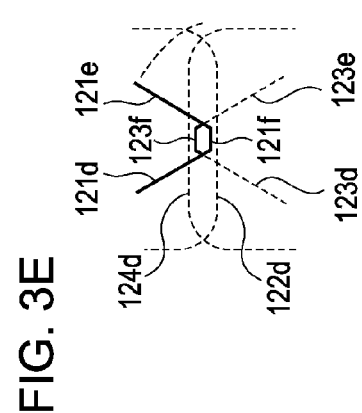
FIG. 3F

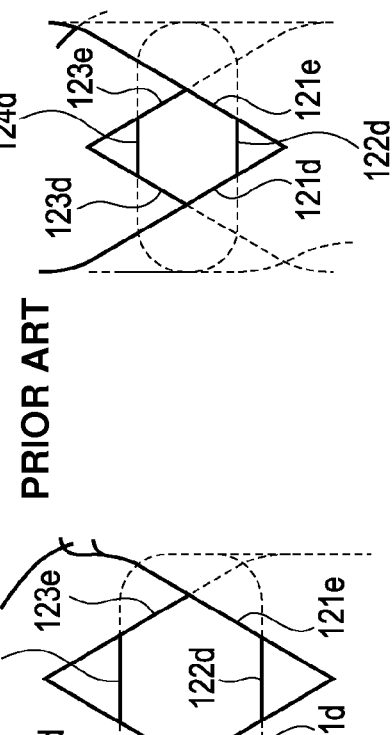
FIG. 8A
PRIOR ART
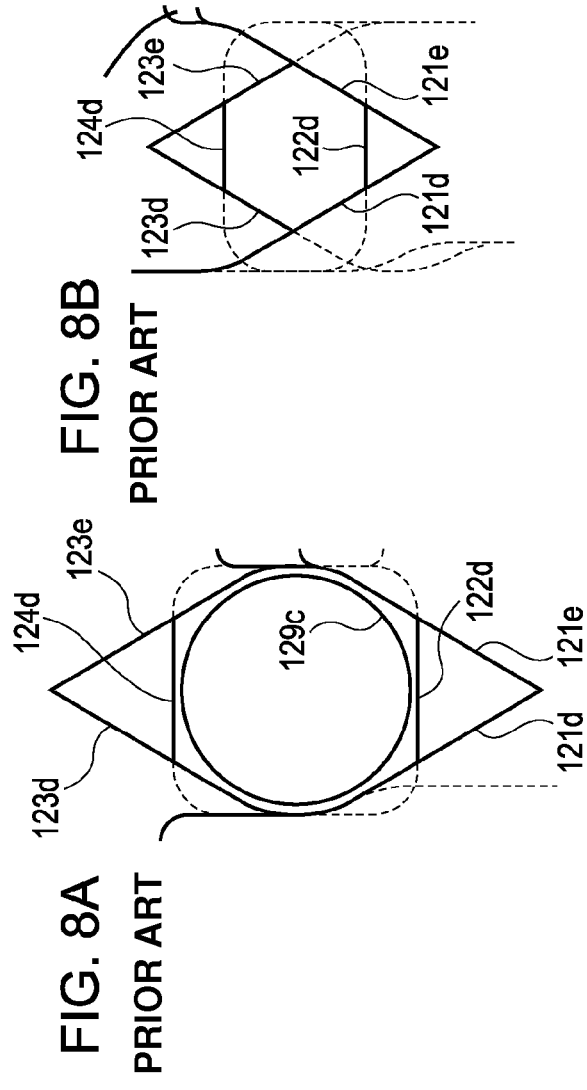
FIG. 8B
PRIOR ART
FIG. 8C
PRIOR ART
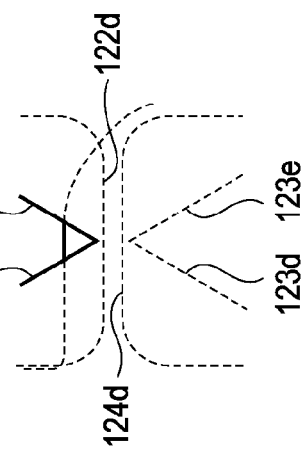
FIG. 8D
PRIOR ART
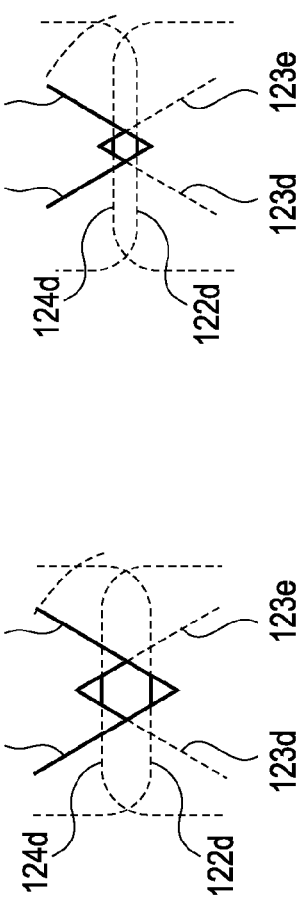
FIG. 8E
PRIOR ART
FIG. 8F
PRIOR ART

APERTURE UNIT AND LENS BARREL INCLUDING THE SAME

BACKGROUND OF THE INVENTION

1. Field of the Invention

The present invention relates to an aperture unit that adjusts the amount of light that passes through an imaging system, and to a lens barrel including the aperture unit.

2. Description of the Related Art

Image pickup apparatuses, such as digital cameras and video cameras, include an aperture unit that adjusts the amount of light that passes through an imaging system when taking an image. An example of such aperture unit is a so-called iris aperture unit that changes the shape of an aperture through which light passes while maintaining a substantially circular shape of the aperture by rotating a plurality of diaphragm blades using a member that rotates around the optical axis. With the iris aperture unit, an aesthetically pleasing blur can be realized in a taken image, because the aperture of the iris aperture unit has a substantially circular shape.

However, because the iris aperture unit includes a large number of components, an apparatus including the iris aperture unit tends to be large.

Another example is a guillotine-type aperture unit that changes the shape of an aperture by moving two diaphragm blades in opposite directions between an open aperture state and a closed aperture state. The guillotine-type aperture unit, which has a smaller number of components and has a simple structure, is widely used in consumer-oriented cameras and other apparatuses. However, the aesthetic quality of blur of an image taken by using the guillotine-type aperture unit tends to be lower than that of an image taken by using the iris aperture unit, because the aperture of the guillotine-type aperture unit has a substantially rhombic shape.

Regarding a mechanism for driving diaphragm blades, Japanese Patent Publication No. 6-3520 and Japanese Patent Laid-Open No. 10-301159 each disclose a guillotine-type aperture unit including three or more diaphragm blades. The aperture of such an aperture unit has a polygonal shape, whereby the aesthetic quality of the blur is improved compared with the case where the aperture has a substantially rhombic shape.

Japanese Patent Publication No. 6-3520 describes an aperture unit having a pentagonal aperture formed by three diaphragm blades and an aperture unit having a hexagonal aperture formed by four diaphragm blades. Japanese Patent Laid-Open No. 10-301159 also describes an aperture unit having a hexagonal aperture formed by four diaphragm blades.

When three or more diaphragm blades are used in a guillotine-type aperture unit so as to form a polygonal aperture, the movement distances of the diaphragm blades are larger than those when two diaphragm blades are used. In the guillotine-type aperture unit, sides of the polygonal aperture (aperture edges) are formed by using a combination of diaphragm blades that move larger distances and diaphragm blades that move smaller distances. As compared with the diaphragm blades of an aperture unit having a rhombic aperture, the diaphragm blades that move larger distances have smaller vertex angles at the aperture, and the distances between the optical axis and the vertices of such diaphragm blades are large in an open aperture state. When the aperture unit also functions as a shutter, the overlap amount of diaphragm blades in a closed aperture state are to be large in order to prevent double exposure due to rebound of the shutter. Therefore, the movement distances of the diaphragm blades are to be increased. In order to move the diaphragm blades by larger distances, the size of the aperture unit has to be increased. Moreover, the diaphragm blades are moved by using a long arm, which is difficult to actuate. Thus, in order to reduce the size of an aperture unit, it is important to minimize the movement distances of the diaphragm blades.

Diffraction of light physically occurs at the aperture. When the aperture is small, diffraction of light significantly influences the optical performance, so that the imaging performance is decreased. Therefore, except when taking an image of a specific object, an aperture value that has a small influence on the optical performance is normally used. To further reduce the amount of light, an ND filter is inserted in the optical path to adjust the amount of light. A small aperture state may be employed, for example, when taking an image of an object in full sunlight. However, because the optical performance is decreased under such a circumstance due to the influence of diffracted light, a strictly polygonal aperture for producing an aesthetically pleasing blur is not necessary.

Therefore, it is important that the shape of the aperture maintains a similar polygonal shape at least in the range from the open aperture to a normally used aperture value. Moreover, it is important to appropriately set the shape of the aperture formed by the diaphragm blades so as to reduce the movement distances of the diaphragm blades.

SUMMARY OF THE INVENTION

According to an aspect of the present invention, an aperture unit includes three or more diaphragm blades; a base plate that supports the three or more diaphragm blades such that the blades are linearly movable in directions perpendicular to an optical axis; a drive lever connected to the blades, the drive lever being rotatable; and an aperture motor that rotates the drive lever, wherein two or more of the blades that linearly move in a first direction have aperture edges having different shapes, and a polygonal aperture is formed by the aperture edges of the two or more blades and an aperture edge of at least one of the three or more blades that linearly moves in a second direction opposite to the first direction, wherein movement distances and movement speeds of the two or more blades that move in the first direction from an open aperture state to a closed aperture state are respectively different from one another, and among the two or more blades, blades that move large distances at high speeds have aperture edges that are parallel to aperture edges of blades that move small distances at low speeds.

Further features of the present invention will become apparent from the following description of exemplary embodiments with reference to the attached drawings.

BRIEF DESCRIPTION OF THE DRAWINGS

FIGS. 2A to 2F are front views of the aperture unit according to the first embodiment of the present invention, illustrating a change in the shape of an aperture.

FIGS. 3A to 3F are enlarged views of the aperture unit illustrated in FIGS. 2A to 2F.

FIGS. 8A to 8F illustrate the aperture of an existing aperture unit.

DESCRIPTION OF THE EMBODIMENTS

Figure 1:
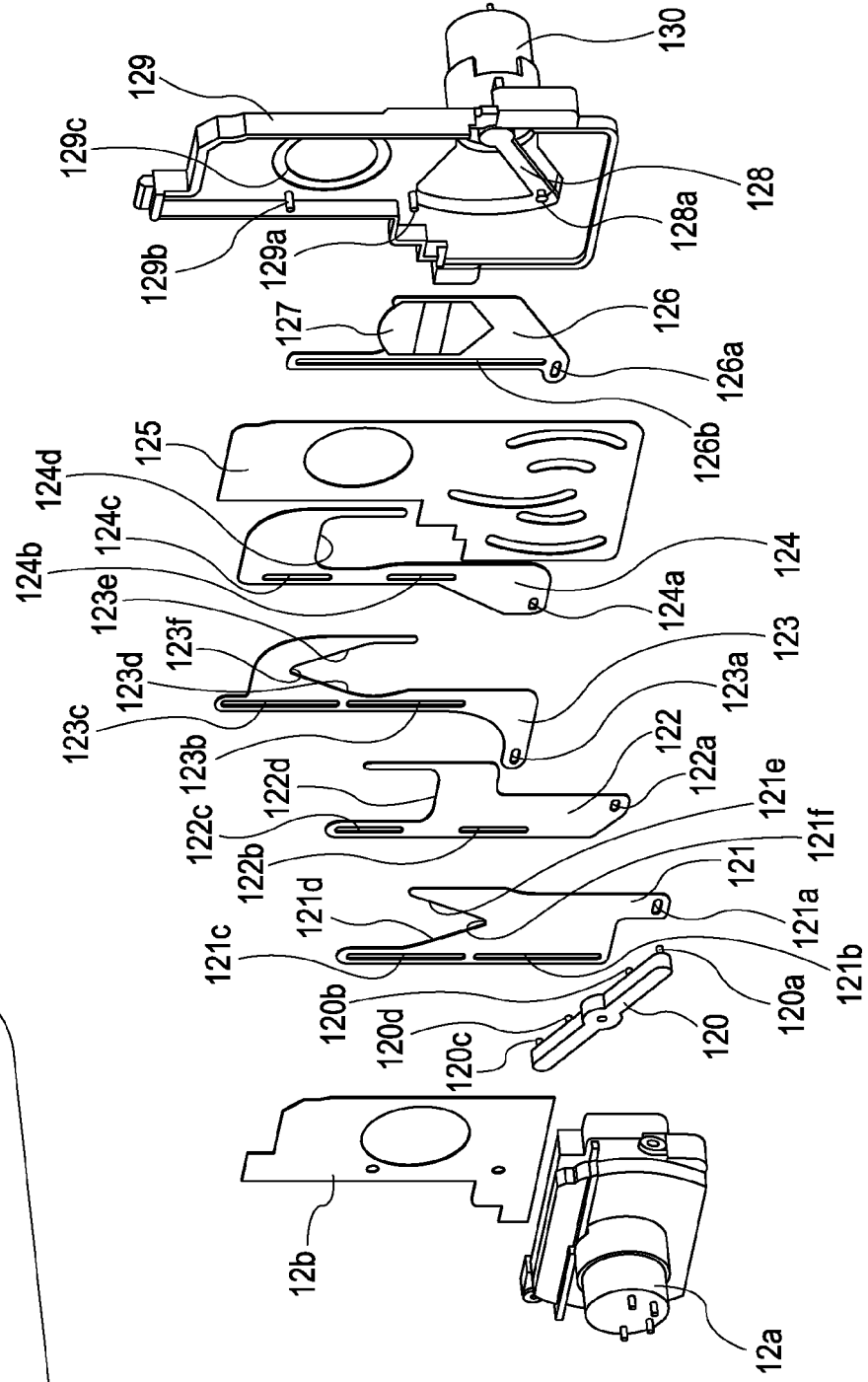
FIG. 1 is an exploded perspective view of an aperture unit according to a first embodiment of the present invention.
Figure 4B:
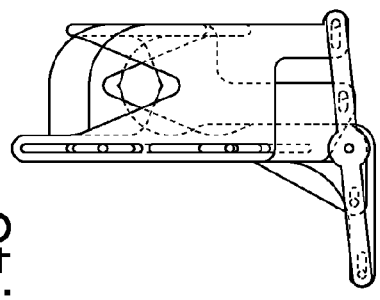
FIGS. 4A to 4F are front views of the aperture unit according to a second embodiment of the present invention, illustrating a change in the shape of an aperture.
Figure 4A:
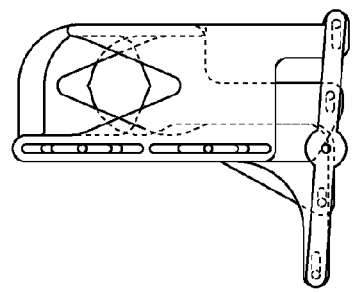
Figure 4D:
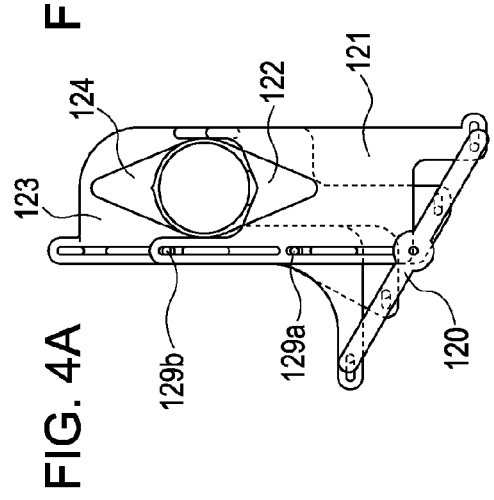
Figure 4F:
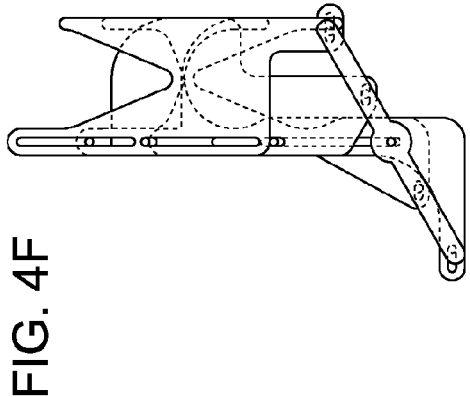
Figure 4E:
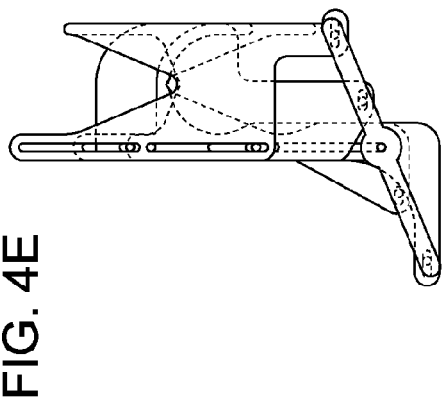
Figure 4C:
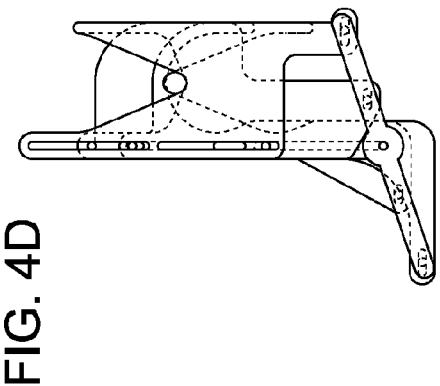

Hereinafter, embodiments of the present invention will be described with reference to the drawings.

An aperture unit according to the present invention, which is used in an optical path of an optical system (imaging optical system), includes three or more diaphragm blades for adjusting the amount of light that passes through the optical system. The aperture unit includes a base plate 129 and guide pins 129a and 129b formed on the base plate 129. The guide pins 129a and 129b support the three or more diaphragm blades in such a manner that the diaphragm blades can be linearly moved in directions perpendicular to the optical axis. The diaphragm blades are moved by rotating a drive lever 120, which is connected to the three or more diaphragm blades, by using a galvanometer (motor) 12a.

Diaphragm blades 121 and 122 linearly move in a first direction. The aperture edges of the diaphragm blades 121 and 122 have different shapes. A polygonal aperture is formed by the aperture edges of the diaphragm blades 121 and 122 and the aperture edge of at least one diaphragm blade that linearly moves in a second direction opposite to the first direction. The movement distances and the movement speeds of the diaphragm blades 121 and 122, which move in the first direction, from the open aperture state to the closed aperture state are different from each other. The diaphragm blade 121 moves a large distance at a high speed, and the diaphragm 122 moves a small distance and at a low speed. The aperture edges of the diaphragm blades 121 and 122 are parallel to each other. The term "reference aperture value" refers to an aperture value at which a polygonal aperture is formed only by the aperture edges of the diaphragm blades when the diaphragm blades are moved from the open aperture state. When the aperture value is in the range from the reference aperture value to a specific aperture value that is smaller than the reference aperture value, a polygonal aperture is formed by the aperture edges of the diaphragm blades 121 and 122, which linearly move in the first direction, and the aperture edge of at least one diaphragm blade that moves in the second direction opposite to the first direction. When the aperture value is in the range from the specific aperture value to the closed aperture, an aperture is formed by the aperture edge of the diaphragm blade 121 and the aperture edge of a diaphragm blade 123, the diaphragm blades 121 and 123 moving in opposite directions.

Figure 9:
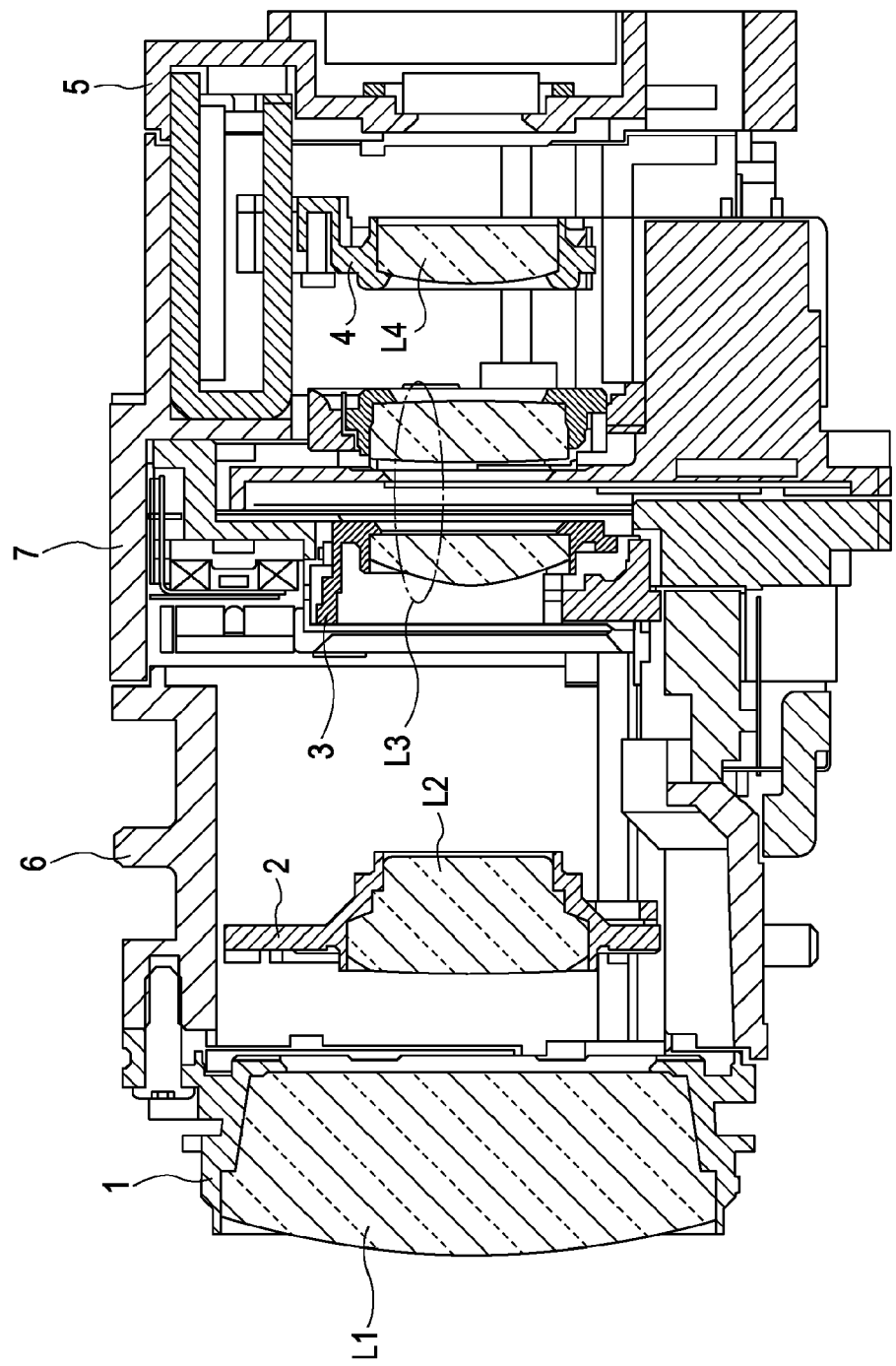
FIG. 9 is a sectional view of a lens barrel including the aperture unit according to an embodiment of the present invention.
Figure 10:
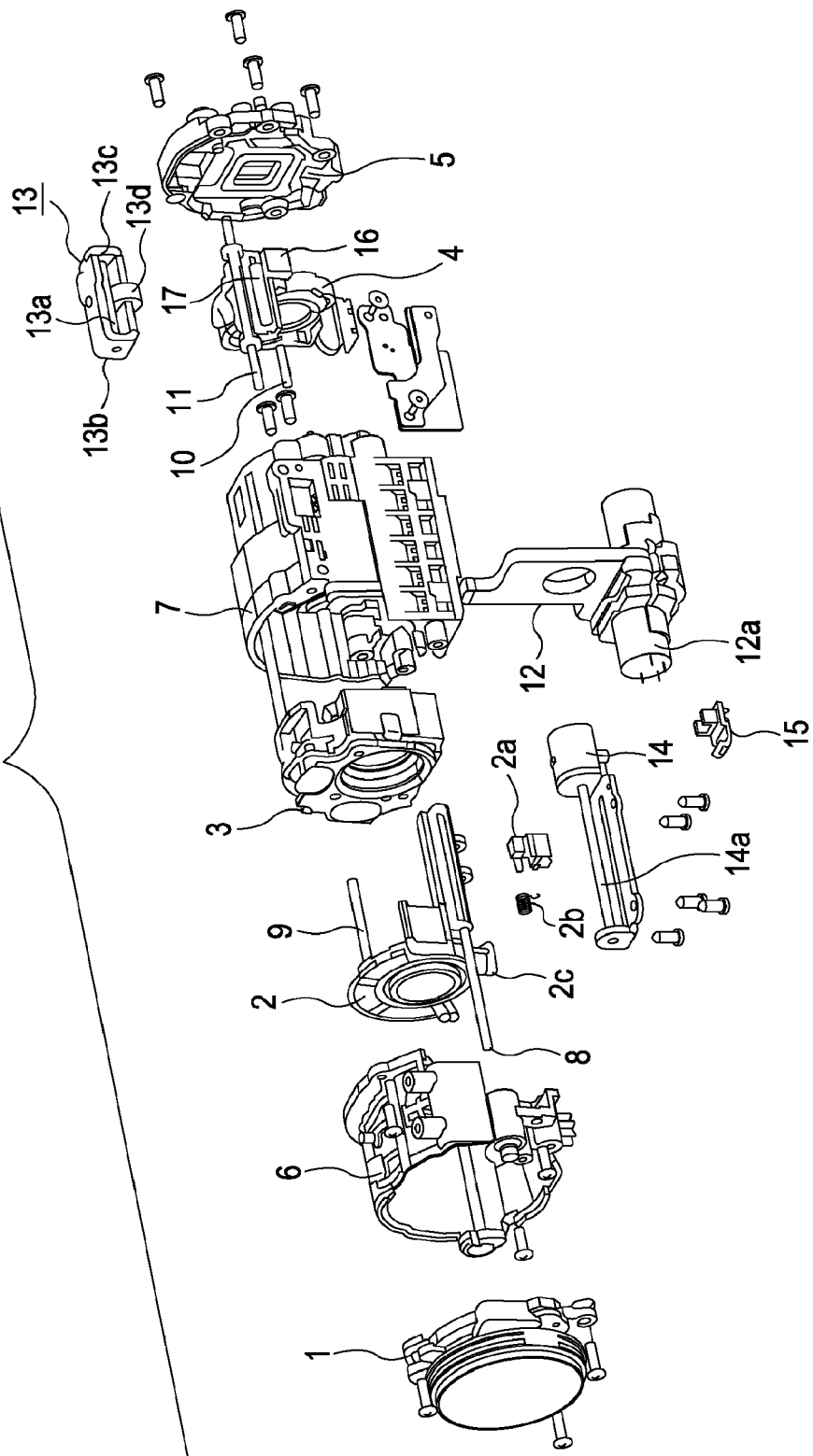
FIG. 10 is an exploded perspective view of the lens barrel including the aperture unit according to the present invention.

FIG. 9 is a sectional view of a lens barrel including an aperture unit according to an embodiment of the present invention. FIG. 10 is an exploded perspective view of FIG. 9. The lens barrel of the present embodiment is attached to or integrally formed with an image pick apparatus such as a video camera or a digital still camera.

The lens barrel of the present embodiment includes, for example, a zoom optical system (zoom lens) including four lens groups respectively having a positive, a negative, a positive, and a positive refractive power. The lens barrel may include any type of optical system. A first lens group L1 is fixed (immobilized) with respect to the optical axis direction.

A second lens group L2 moves in the optical axis direction for zooming. A third lens group L3 includes a stabilization optical element that performs camera-shake correction (image stabilization) by moving in vertical and horizontal directions that are perpendicular to the optical axis, which will be described below. A fourth lens group L4 moves in the optical axis direction so as to perform focusing and correction of an image plane that varies in accordance with zooming.

The first lens group L1 is held by a fixed lens barrel 1. The second lens group L2 is held by a second lens group movement frame 2. The third lens group L3 is held by a shift unit 3. The fourth lens group L4 is held by a fourth lens group movement frame 4.

A CCD holder 5, to which an imaging element such as a CCD is attached, is disposed behind the fourth lens group movement frame 4 (on a side nearer to an image). The fixed lens barrel 1 is screwed to a front fixed barrel 6. The CCD holder 5 and the front fixed barrel 6 are screwed to a rear fixed barrel 7.

The second lens group movement frame 2 is supported by guide bars 8 and 9 so as to be movable in the optical axis direction. The guide bars 8 and 9 are positioned relative to and fixed to the front fixed barrel 6 and the rear fixed barrel 7. The fourth lens group movement frame 4 is supported by guide bars 10 and 11 so as to be movable in the optical axis direction. The guide bars 10 and 11 are positioned relative to and fixed to the CCD holder 5 and the rear fixed barrel 7.

The shift unit 3 is positioned relative to the rear fixed barrel 7 and fixed to the rear fixed barrel 7 using a screw. An aperture unit 12 is disposed in the third lens group L3 (as will be described below in detail). The galvanometer 12a drives the aperture unit 12.

The fourth lens group L4 is driven by a voice coil motor 13 in the optical axis direction. The voice coil motor 13 includes a magnet 13a, a yoke 13b, a yoke 13c, and a coil 13d. The yoke 13b of the voice coil motor 13 is press-fitted into the rear fixed barrel 7. The magnet 13a and the yoke 13c are fixed to the yoke 13b by magnetic force. By applying an electric current to the coil 13d, a Lorentz force is generated in the coil 13d, whereby the coil 13d can be driven in the optical axis direction. The coil 13d is fixed to the fourth lens group movement frame 4. When the coil 13d is driven, the fourth lens group movement frame 4 is driven in the optical axis direction.

A zoom motor 14 is fixed to the rear fixed barrel 7 with two screws. The second lens group L2 is driven by the zoom motor (stepping motor) 14 in the optical axis direction for zooming. The zoom motor 14 includes a lead screw 14a that is coaxial with a rotor. The lead screw 14a meshes with a rack 2a that is disposed on the second lens group movement frame 2. The second lens group L2 is driven in the optical axis direction by the rotation of the rotor. The guide bars 8 and 9, the rack 2a, and the lead screw 14a are urged by a torsion coil spring 2b, so that looseness of fitting or meshing is prevented.

A photointerrupter 15 optically detects a movement of a light-blocking portion 2c, which is formed in the second lens group movement frame 2, in the optical axis direction. The photointerrupter 15 is used as a zoom reset switch for detecting whether the second lens group L2 is located at the reference position.

An encoder (optical sensor) 16, which is fixed to the rear fixed barrel 7, includes a light emitter and a light receiver. The optical sensor 16 irradiates an optical scale 17, which is bonded to the fourth lens group movement frame 4, with light emitted by the light emitter and reads reflected light with the light receiver, and thereby detects the absolute position of the fourth lens group L4 in the optical axis direction.

The shift unit 3 holds the third lens group L3 in such a manner that the third lens group L3 can move in a plane that is perpendicular to the optical axis. The third lens group L3 is driven in a plane that is perpendicular to the optical axis direction by a vertical drive actuator. The vertical drive actuator corrects blur of an image that occurs when the lens barrel or the direction of shooting is shaken in a pitch direction, i.e., in a vertical direction. Moreover, the third lens group L3 is driven in a plane that is perpendicular to the optical axis direction by a horizontal drive actuator. The horizontal drive actuator corrects blur of an image that occurs when the lens barrel or the direction of shooting is shaken in a yaw direction, i.e., in a horizontal direction.

Figure 11:
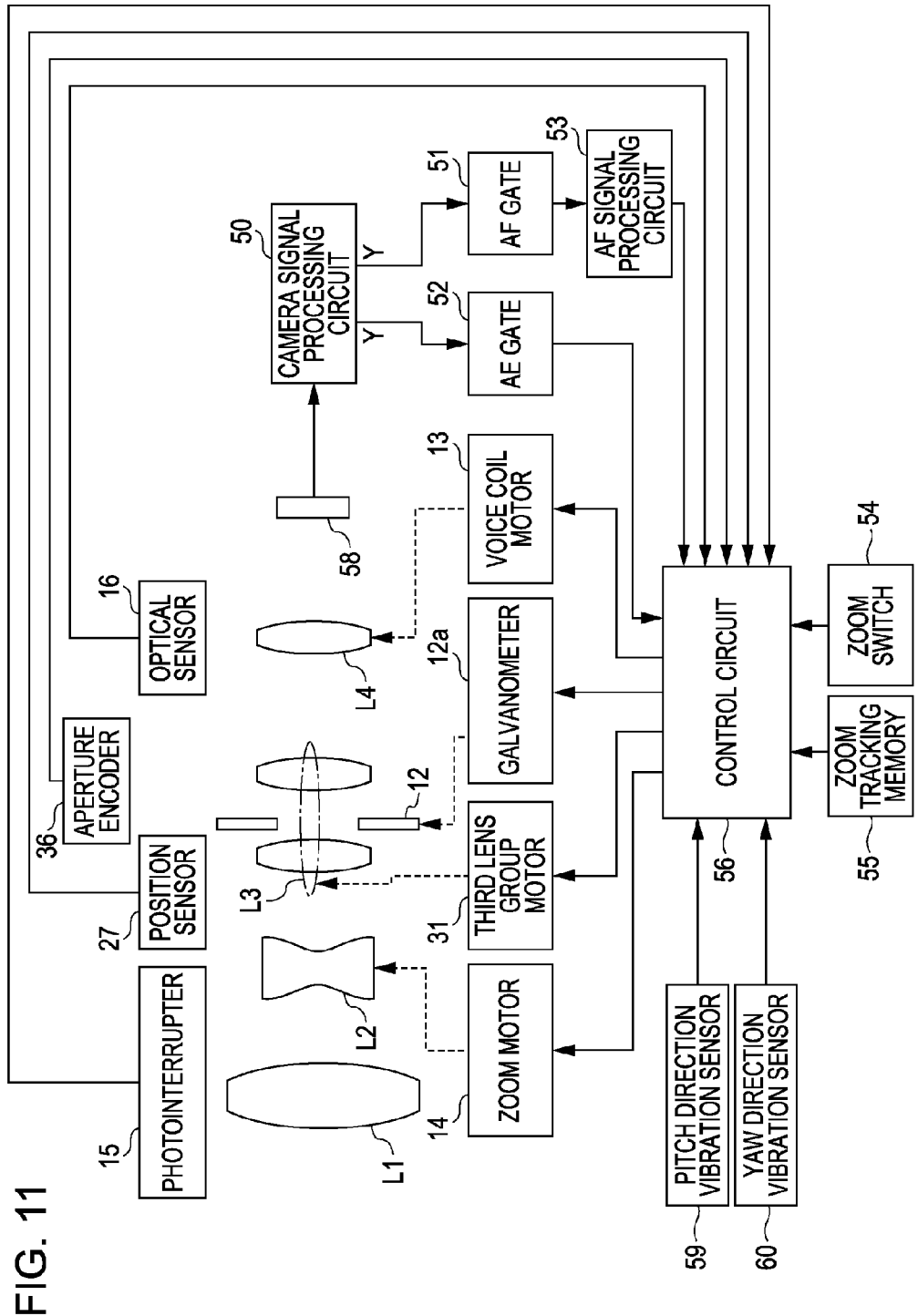
FIG. 11 is a block diagram illustrating the structure of the electric circuits of a camera including the lens barrel including the aperture unit according to the present invention.

FIG. 11 is a block diagram of an image pickup apparatus (optical apparatus) including a lens barrel according to the embodiment of the present invention, illustrating the structure of the electric circuits related to driving of the components of the image pickup apparatus. In FIG. 11, the same elements illustrated in FIGS. 9 and 10 are denoted by the same numerals.

As illustrated in FIG. 11, the image pickup apparatus of the present embodiment includes a pitch direction vibration sensor 59 and a yaw direction vibration sensor 60 respectively for detecting the change in the orientations of the camera in the pitch direction and in the yaw direction (horizontal direction). The shift unit 3 includes a position sensor 27 that detects the position of the third lens group L3 in a plane perpendicular to the optical axis (the position in the vertical direction and the position in the horizontal direction). A control circuit 56 (controller of the image pickup apparatus, such as a CPU) controls the actuators on the basis of the output of the vibration sensors 59 and 60 and a signal from the position sensor 27 of the third lens group L3.

The actuators are independently controlled in the pitch direction and in the yaw direction. The actuators are respectively disposed in the vertical direction and in the horizontal direction, so that the actuators drive the third lens group L3 in two directions that are perpendicular to the optical axis and that are perpendicular to each other. By combining the movements in the vertical direction and in the horizontal direction, the third lens group is freely moved within a predetermined range in a plane perpendicular to the optical axis, whereby the image is stabilized.

The photointerrupter 15 detects the movement distance (the position relative to the reference position) of the second lens group movement frame 2 in the optical axis direction by continuously counting the pulse signals that are input to the zoom motor 14 after it has been detected that the second lens group movement frame 2 has moved to the reference position.

An aperture encoder 36, which includes a Hall element that is disposed in the galvanometer 12a, detects the relationship between the position of the rotor and the position of the stator. A camera signal processing circuit 50 performs signal processing such as predetermined amplification and gamma correction on the output of an imaging element 58.

After such processing, a contrast signal of the image signal is supplied to an AE gate 52 and an AF (autofocus) gate 51. The AE gate 52 and the AF gate 51 respectively set ranges of the image signal that are most appropriate for exposure control and focus control. The size of the gate may be variable, or a plurality of gates may be provided.

An AF signal processing circuit 53 generates one or more outputs that are related to the high-frequency component of the image signal.

A zoom switch 54 and a zoom tracking memory 55 are provided. The zoom tracking memory 55 stores positional information of the fourth lens group movement frame 4 for zooming in accordance with the object distance and the movement distance of the second lens group movement frame 2. An internal memory of the control circuit 56 may be used as the zoom tracking memory 55.

For example, when a photographer operates the zoom switch 54, the control circuit 56 performs control so as to maintain a predetermined positional relationship between the second lens group movement frame 2 and the fourth lens group movement frame 4, which is calculated on the basis of the information stored in the zoom tracking memory 55. That is, the control circuit 56 controls driving of the zoom motor 14 and the voice coil motor 13 so that the count value of the absolute position of the second lens group movement frame 2 in the optical axis direction coincides with the calculated position at which the second lens group movement frame 2 is to be set. Moreover, the control circuit 56 controls driving of the zoom motor 14 and the voice coil motor 13 so that the count value of the absolute position of the fourth lens group movement frame 4 in the optical axis direction coincides with the calculated position at which the fourth lens group movement frame 4 is to be set.

When performing autofocus operation, the control circuit 56 controls driving of the voice coil motor 13 so that the output of the AF signal processing circuit 53 becomes the peak value.

In order to obtain correct exposure, the control circuit 56 controls the amount of light by controlling driving of the galvanometer 12a so that the output of the aperture encoder 36 coincides with the average value of Y signal outputs that have passed through the AE gate 52, the average value being a reference value.

The control circuit 56 calculates driving amount of the stabilization optical element for performing image stabilization on the basis of signals from the pitch direction vibration sensor 59, the yaw direction vibration sensor 60, and the position sensor 27. The control circuit 56 controls electric current supplied to the driver coils of a third lens group motor 31. Thus, the control circuit 56 controls the stabilization optical element so as to stabilize the image.

In the embodiment described above, an image pickup apparatus having the lens barrel integrally formed with the camera body is described. The lens barrel according to the present invention can be applied to an interchangeable lens unit that can be attached to and removed from the camera body, and to a film camera, a digital still camera, a video camera, and the like.

First Embodiment

Referring to FIGS. 1 to 3F, an aperture unit according to a first embodiment of the present invention will be described.

FIG. 1 is an exploded perspective view of the aperture unit the first embodiment of the present invention. FIGS. 2A to 2F are front views of the aperture unit according to the first embodiment of the present invention, illustrating a change in the shape of an aperture. FIGS. 3A to 3F are enlarged views of the aperture unit illustrated in FIGS. 2A to 2F.

The galvanometer 12a drives a plurality of diaphragm blades. The drive lever 120 is connected to an output shaft of the galvanometer 12a. The drive lever 120 includes driver pins 120a, 120b, 120c, and 120d that engage with slots formed in the diaphragm blades and that drive the diaphragm blade. The base plate 129 includes a fixed diaphragm 129c having a circular aperture and the guide pins 129a and 129b that guide the diaphragm blades 121 to 124 and an ND filter diaphragm 126.

The diaphragm blades 121 to 124 will be described. The diaphragm blade 121 includes movement guides 121b and 121c that engage with the guide pins 129a and 129b of the base plate 129 as described below. The diaphragm blade 121 further includes a slot 121a that engages with the driver pin 120a of the drive lever 120. The diaphragm blade 122 includes movement guides 122b and 122c that engage with the guide pins 129a and 129b of the base plate 129 as described below. The diaphragm blade 122 further includes a slot 122a that engages with the driver pin 120b of the drive lever 120. The diaphragm blade 123 includes movement guides 123b and 123c that engage with the guide pins 129a and 129b of the base plate 129 as described below. The diaphragm blade 123 further includes a slot 123a that engages with the driver pin 120c of the drive lever 120. The diaphragm blade 124 includes movement guides 124b and 124c that engage with the guide pins 129a and 129b of the base plate 129 as described below. The diaphragm blade 124 further includes a slot 124a that engages with the driver pin 120d of the drive lever 120.

In the present embodiment, the aperture shape of each of the diaphragm blades 121 to 124 is determined so that the four diaphragm blades form a hexagonal aperture. When the drive lever 120 rotates, the diaphragm blades 121 and 122 move in a first direction at different speeds and the diaphragm blades 123 and 124 move in a second direction that is opposite to the first direction at different speeds, whereby the aperture shape is changed from the open aperture to the closed aperture state.

The driver pin 120a is disposed farther from the rotation center of the drive lever 120 than the driver pin 120b. Therefore, the diaphragm blade 121 moves a larger distance at a higher speed than the diaphragm blade 122. The driver pin 120c is disposed farther from the rotation center of the drive lever 120 than the driver pin 120d. Therefore, the diaphragm blade 123 moves a larger distance at a higher speed than the diaphragm blade 124.

A galvanometer 130 drives the ND filter diaphragm 126. A drive lever 128 is connected to the output shaft of the galvanometer 130. The drive lever 128 includes a driver pin 128a that engages with a slot 126a formed in the ND filter diaphragm 126. An ND filter 127 is bonded to the ND filter diaphragm 126 that holds the ND filter 127. A slot 126b guides a movement of the ND filter diaphragm 126. The slot 126a engages with the driver pin 128a. When the drive lever 128 rotates, the ND filter 127 is inserted to or extracted from the optical path.

A partition plate 125 is disposed between the ND filter diaphragm 126 and the diaphragm blades 121 to 124. A metal plate 12b covers the diaphragm blades.

Next, the aperture shapes of the diaphragm blades of the aperture unit according to the present invention will be described. FIGS. 3A to 3F are enlarged views of the aperture unit illustrated in FIGS. 2A to 2F, illustrating the change in the aperture shape from an open aperture state to a closed aperture state. The diaphragm blades 121 and 122 move upward in FIGS. 3A to 3F. The diaphragm blades 123 and 124 move downward in FIGS. 3A to 3F.

The fixed diaphragm 129c is formed in the base plate 129. The fixed diaphragm 129c determines the aperture diameter in the open aperture state.

An aperture edge 122d of the diaphragm blade 122 forms one side of a hexagon. Aperture edges 121d and 121e of the diaphragm blade 121 each form one side of the hexagon. An aperture edge 121f of the diaphragm blade 121 is substantially parallel to the aperture edge 122d. An aperture edge 124d of the diaphragm blade 124 forms one side of the hexagon. Aperture edges 123d and 123e of the diaphragm blade 123 each form one side of the hexagon. An aperture edge 123f of the diaphragm blade 123 is substantially parallel to the aperture edge 124d.

In the present embodiment, a reference aperture value and a specific aperture value are defined by the shape of the aperture of the aperture unit. The term "reference aperture value" refers to an aperture value at which the aperture is formed by only the aperture edges of the diaphragm blades when the size of the aperture is decreased from the open aperture state. The term "specific aperture value" refers to an aperture value at which the shape of the aperture can maintain a similar shape when the size of the aperture is decreased from that of the reference aperture value.

In FIGS. 3B and 3C, the aperture edges of the four diaphragm blades 121 to 124 form a hexagonal aperture. At the reference aperture value (not shown), the four diaphragm blades form a hexagonal aperture that is larger than that of FIG. 3B. FIG. 3D illustrates a state corresponding to the specific aperture value. In this state, the aperture edges 121f and 122d overlap each other and the aperture edges 123f and 124d overlap each other, and an aperture shape that is similar to the hexagonal aperture illustrated in FIGS. 3B and 3C is maintained.

FIGS. 3A to 3D correspond to the range of aperture value that is normally used. The positions of the aperture edges 121f and 123f are determined so that the shape of the aperture can maintain a similar (hexagonal) shape in this range. FIG. 3E illustrates a state in which the size of the aperture is further decreased. In this state, the aperture edge 121f overtakes the aperture edge 122d. Moreover, the aperture edge 123f overtakes the aperture edge 124d. As a result, the two diaphragm blades 121 and 123 form an aperture having an oblong shape. FIG. 3F illustrates a closed aperture state in which the aperture is completely closed. The distance between the aperture edge 121f to the aperture edge 123f is the overlap amount OD of the diaphragm blades.

As described above, the aperture unit according to the present embodiment includes the two diaphragm blades 121 and 122 that move in the first direction and two diaphragm blades 123 and 124 that move in the second direction that is opposite to the first direction. In the range from the reference aperture value (not shown) to the specific aperture value (FIG. 3D), the diaphragm blades 121 to 124 form a hexagonal aperture. A part of the hexagonal aperture is formed by the aperture edge 122d of the diaphragm blade 122 that moves a small distance at a low speed in the first direction and the two aperture edges 121d and 121e of the diaphragm blade 121 that moves a large distance at a high speed in the first direction. The remaining part of the hexagonal aperture is formed by the aperture edge 124d of the diaphragm blade 124 that moves a small distance at a low speed in the second direction opposite to the first direction and the two aperture edges 123d and 123e of the diaphragm blade 123 that moves a large distance at a high speed in the second direction. In the range from the specific aperture value (FIG. 3D) to the closed aperture (FIG. 3F), the aperture is formed by the aperture edges 121d, 121e, 121f, 123d, 123e, and 123f of the two diaphragm blades 121 and 123 that move large distances at high speeds in opposite directions.

FIGS. 8A to 8F are schematic views of the aperture of an existing aperture unit. In FIGS. 8A to 3F, the members the same as those of FIGS. 3A to 3F are denoted by the same numerals. The existing aperture unit includes four diaphragm blades that are driven in the same manner as in the first embodiment.

The existing aperture unit differs from the first embodiment of the present invention in that the existing aperture unit does not have the aperture edge 121f of the diaphragm blade 121 and the aperture edge 123f of the diaphragm blade 123 illustrated in FIGS. 3A to 3F. With the existing aperture unit, when the aperture is a small aperture state as illustrated in FIG. 8E, a hexagonal aperture having a similar shape is maintained. However, in order to make the overlap amount in the closed aperture state illustrated in FIG. 8F to be substantially the same as the overlap amount illustrated in FIG. 3F, the movement distances of the diaphragm blades 121 and 123 of the existing aperture unit illustrated in FIGS. 8A to 8F are to be made larger than those of the first embodiment illustrated in FIGS. 1 to 3F. As a result, the size of the aperture unit increases.

As described above, when the aperture is in a small aperture state, the optical performance decreases due to the influence of diffracted light. Therefore, when an aperture value is made smaller than the range of the normally used aperture value, an ND filter that is driven by an independent driving unit is inserted in the optical path so as to adjust the amount of light. A small aperture state illustrated in FIG. 3E or 8E may be employed for specific objects such as those in full sunlight. However, under such conditions, an aperture having a regular hexagonal shape for realizing an aesthetic quality of the blur is not necessary, because the optical performance decreases due to the influence of diffraction of light.

Thus, in the present embodiment, the diaphragm blades 121 and 123 that move large distances at high speeds include the aperture edges 121f and 123f that are parallel to the aperture edges 122d and 124d of the diaphragm blades 122 and 124 that move small distances at low speeds. Moreover, the range in which the aperture maintains a similar hexagonal shape (FIGS. 3A to 3D) is the range of the normally used aperture value.

According to the present embodiment, the movement distances of the diaphragm blades can be reduced, whereby a small aperture unit can be obtained.

Second Embodiment

Referring to FIGS. 4A to 5F, an aperture unit according to a second embodiment of the present invention will be described. FIGS. 4A to 4F are front views of the aperture unit according to the second embodiment of the present invention, illustrating a change in the shape of an aperture. FIGS. 5A to 5F are enlarged views of the aperture of the aperture unit illustrated in FIGS. 4A to 4F.

The overall structure of the aperture unit according to the second embodiment is the same as that of the aperture unit according to the first embodiment illustrated in FIGS. 1 to 3F. The second embodiment differs from the first embodiment in that an octagonal aperture is formed by changing the aperture shapes of the four diaphragm blades 121 to 124.

FIGS. 5A to 5F are enlarged views of the aperture formed by the diaphragm blades 121 to 124 illustrated in FIGS. 4A to 4F, illustrating the change in the aperture shape from the open aperture state to the closed aperture state.

A fixed diaphragm 129c is formed in a base plate 129. The fixed diaphragm 129c, which has a circular aperture, determines the aperture diameter in the open aperture state.

Aperture edges 122e and 122f of the diaphragm blade 122 each form one side of the octagonal aperture. Aperture edges 121g and 121h of the diaphragm blade 121 each form one side of the octagonal aperture. An aperture edges 121j of the diaphragm blade 121 is parallel to or substantially parallel to the aperture edge 122e, and an aperture edge 121k of the diaphragm blade 121 is parallel to or substantially parallel to the aperture edge 122f. Aperture edges 124e and 124f of the diaphragm blade 124 each form one side of the octagonal aperture. Aperture edges 123g and 123h of the diaphragm blade 123 each form one side of the octagonal aperture. An aperture edges 123j of the diaphragm blade 123 is parallel to or substantially parallel to the aperture edge 124e, and an aperture edge 123k of the diaphragm blade 123 is parallel to or substantially parallel to the aperture edge 124f.

Figures 5A, 5B, 5C:
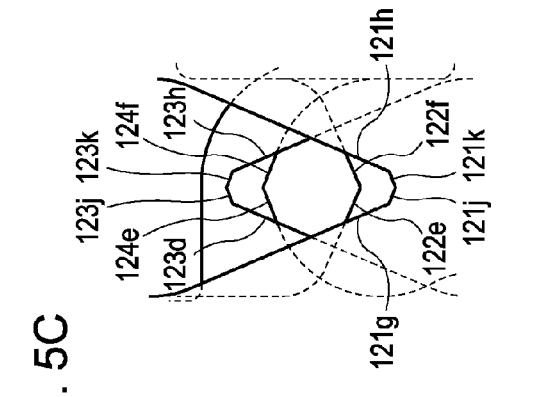
FIGS. 5A to 5F are enlarged views of the aperture illustrated in FIGS. 4A to 4F.
Figures 5D, 5E, 5F:
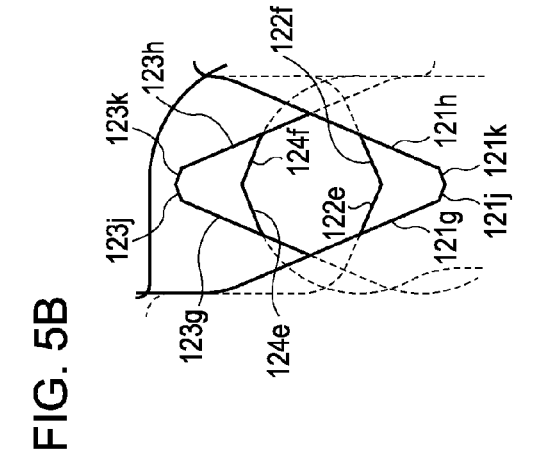
Figure 6C:
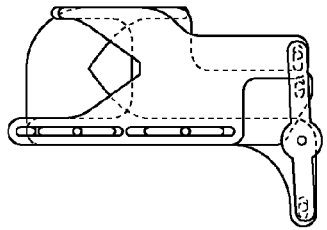
FIGS. 6A to 6F are front views of the aperture unit according to a third embodiment of the present invention, illustrating a change in the shape of an aperture.
Figure 6F:
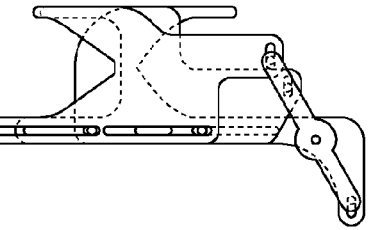
Figure 6B:
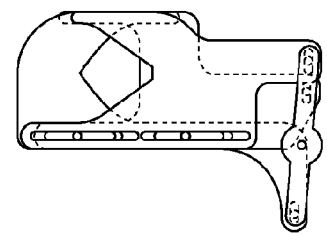
Figure 6E:
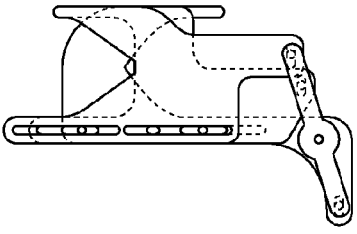
Figure 6A:
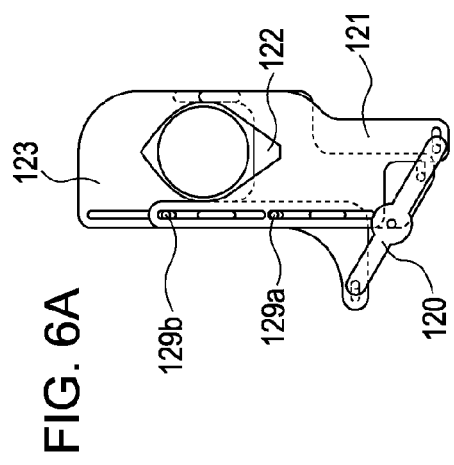
Figure 6D:
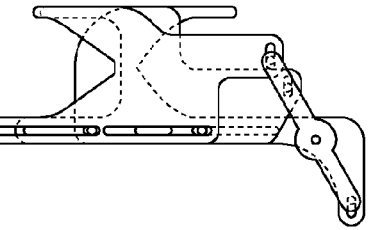

In FIGS. 5B and 5C, the aperture edges of the four diaphragm blades 121 to 124 form octagonal apertures. Likewise, when the aperture value is the reference aperture value (not shown), the four diaphragm blades form an octagonal aperture that is larger than that of FIG. 5B. In FIG. 5D, which corresponds to the specific aperture value, the aperture edges 121j and 122e, the aperture edges 121k and 122f, the aperture edges 123j and 124e, and the aperture edges 123k and 124f respectively overlap each other, and the aperture maintains an octagonal shape similar to those of FIGS. 5B and 5C.

FIGS. 5A to 5D correspond to the range of normally used aperture value. The positions of the aperture edges 121j, 121k, 123j, and 123k are determined so that the shape of the aperture changes while maintaining the similar (octagonal) shape when the aperture value is in this range. In FIG. 5E, which corresponds to a smaller aperture value, the aperture edge 121j overtakes the aperture edge 122e, the aperture edge 121k overtakes the aperture edge 122f, the aperture edge 123j overtakes the aperture edge 124e, and the aperture edge 123k overtakes the aperture edge 124f. Thus, the diaphragm blade 121 and the diaphragm blade 123 form the aperture shape, which is oblong. FIG. 5F illustrates the closed aperture state. The distance between the intersection of the aperture edge 121j and the aperture edge 121k and the intersection of the aperture edge 123j and the aperture edge 123k is the overlap amount OD of the diaphragm blades.

When the aperture edges 121j, 121k, 123j, and 123k are not provided, as in the first embodiment, the aperture having a similar octagonal shape can be maintained even when the aperture is small. However, in order to secure the overlap amount OD in the closed aperture state, the movement distances of the diaphragm blades are further increased. As a result, the size of the aperture unit increases.

As described above, when the aperture is in a small aperture state, the optical performance decreases due to the influence of diffracted light. Therefore, when employing an aperture smaller than the range of the normally used aperture value, an ND filter driven by an independent driving unit is inserted in the optical path so as to adjust the amount of light. A small aperture state illustrated in FIG. 5E may be employed, for example, when taking an image of an object in full sunlight. However, because the optical performance is decreased under such a circumstance due to the influence of diffracted light, a strictly polygonal aperture for producing an aesthetically pleasing blur is not necessary.

Thus, in the present embodiment, the diaphragm blades 121 and 123 that move large distances at high speeds include the aperture edges that are parallel to the aperture edges of the diaphragm blades 122 and 124 that move small distances at low speeds. Moreover, the range in which the aperture maintains a similar octagonal shape (FIGS. 5A to 5D) is the range of the normally used aperture value.

As described above, the aperture unit according to the present embodiment includes two diaphragm blades 121 and 122 that move in the first direction and two diaphragm blades 123 and 124 that move in the second direction that is opposite to the first direction. In the range from the reference aperture value (not shown) to the specific aperture value (FIG. 5D), the diaphragm blades 121 to 124 form an octagonal aperture. A part of the octagonal aperture is formed by the aperture edges 122e and 122f of the diaphragm blade 122 that move small distances at low speeds and the two aperture edges 121g and 121h of the diaphragm blade 121 that moves a large distance at a high speed. The remaining part of the hexagonal aperture is formed by the two aperture edges 124e and 124f of the diaphragm blade 124 that moves a small distance at a low speed in the second direction opposite to the first direction and the two aperture edges 123g and 123h of the diaphragm blade 123 that moves a large distance at a high speed in the second direction. In the range from the specific aperture value (FIG. 5D) to the closed aperture (FIG. 5F), the aperture is formed by the aperture edges 121g, 121h, 121j, 121k, 123g, 123h, 123j, and 123k of the two diaphragm blades 121 and 123 that move large distances at high speeds in opposite directions.

According to the present embodiment, the movement distances of the diaphragm blades can be reduced, whereby a small aperture unit can be obtained.

Third Embodiment

Referring to FIGS. 6A to 7F, an aperture unit according to a third embodiment of the present invention will be described. FIGS. 6A to 6F are front views of the aperture unit according to the third embodiment of the present invention, illustrating a change in the shape of an aperture. FIGS. 7A to 7F are enlarged views of the aperture illustrated in FIGS. 6A to 6F.

The overall structure of the aperture unit according to the third embodiment is the same as that of the aperture unit according to the first embodiment illustrated in FIGS. 1 to 3F. The third embodiment differs from the first embodiment in that a pentagonal aperture is formed by three diaphragm blades 121 to 123 instead of four diaphragm blades.

FIGS. 7A to 7F are enlarged views of the aperture formed by the diaphragm blades 121 to 123 illustrated in FIGS. 6A to 6F, illustrating the change in the aperture shape from the open aperture state to the closed aperture state.

A fixed diaphragm 129c is formed in a base plate 129. The fixed diaphragm 129c, which has a circular aperture, determines the aperture diameter in the open aperture state.

An aperture edge 122g of the diaphragm blade 122 forms one side of the pentagonal aperture. Aperture edges 121m and 121n of the diaphragm blade 121 each form one side of the pentagonal aperture. An aperture edge 121o of the diaphragm blade 121 is parallel to or substantially parallel to the aperture edge 122g. Aperture edges 123m and 123n of the diaphragm blade 123 each form one side of the pentagonal aperture.

Figure 7C:
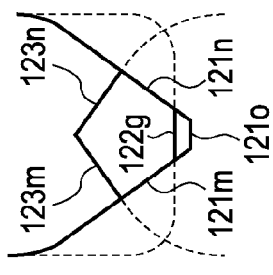
FIGS. 7A to 7F are enlarged views of the aperture illustrated in FIGS. 6A to 6F.
Figure 7F:
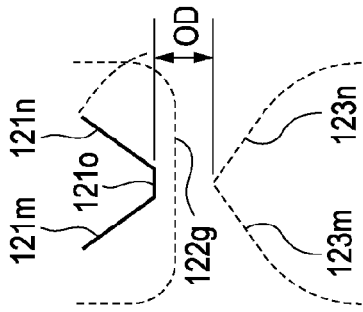
Figure 7B:
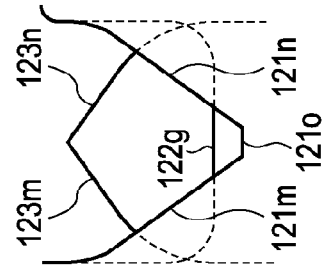
Figure 7E:
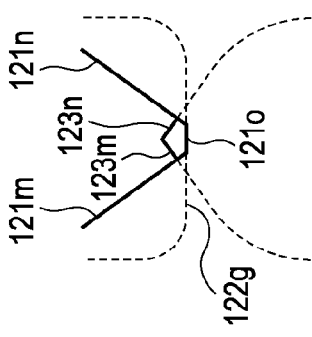
Figure 7A:
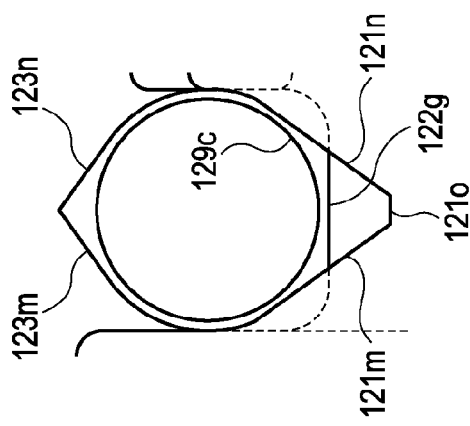
Figure 7D:
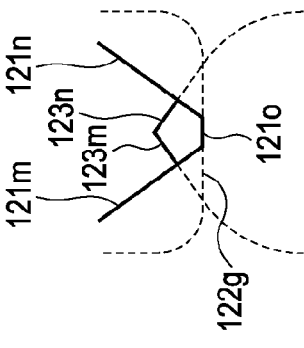

In FIGS. 7B and 7C, aperture edges of the three diaphragm blades 121 to 123 form pentagonal apertures. Likewise, when the aperture value is the reference aperture value (not shown), the three diaphragm blades form a pentagonal aperture that is larger than that of FIG. 7B. In FIG. 7D, which corresponds to the specific aperture value, the aperture edges 121o and 122g overlap each other, and the aperture maintains a pentagonal shape similar to those of FIGS. 7B and 7C. FIGS. 7A to 7D correspond to the range of normally used aperture value. The position of the aperture edge 121o is determined so that the shape of the aperture changes while maintaining the similar (pentagonal) shape when the aperture value is in this range. In FIG. 7E, which corresponds to a smaller aperture value, the aperture edge 121o overtakes the aperture edge 122g. Thus, the diaphragm blade 121 and the diaphragm blade 123 form the aperture shape, which is oblong. FIG. 7F illustrates the closed aperture state. The distance between the aperture edge 121o and the intersection of the aperture edge 123m and the aperture edge 123n is the overlap amount OD of the diaphragm blades.

When the aperture edge 121o is not provided to the diaphragm blade 121, the aperture having a similar pentagonal shape can be maintained even when the aperture is small. However, in order to secure the overlap amount OD in the closed aperture state, the movement distances of the diaphragm blades are further increased. As a result, the size of the aperture unit increases.

As described above, when the aperture is in a small aperture state, the optical performance decreases due to the influence of diffracted light. Therefore, when employing an aperture smaller than the range of the normally used aperture value, an ND filter driven by an independent driving unit is inserted in the optical path so as to adjust the amount of light. A small aperture state illustrated in FIG. 7E may be employed, for example, when taking an image of an object in full sunlight. However, because the optical performance is decreased under such a circumstance due to the influence of diffracted light, a strictly polygonal aperture for producing an aesthetically pleasing blur is not necessary. Thus, in the present embodiment, the diaphragm blade 121 that moves a large distance at a high speed includes the aperture edge that is parallel to the aperture edge of the diaphragm blade 122 that moves a small distance at a low speed. Moreover, the range in which the aperture maintains a similar pentagonal shape (FIGS. 7A to 7D) is the range of the normally used aperture value.

According to the present invention, the movement distances of the diaphragm blades can be reduced, whereby the size of the aperture unit can be reduced.

As described above, the aperture unit according to the present embodiment includes two diaphragm blades 121 and 122 that move in the first direction and one diaphragm blade 123 that moves in the second direction that is opposite to the first direction. When the aperture value is in the range from the reference aperture value (not shown) to the specific aperture value (FIG. 7D), the diaphragm blades 121 to 123 form a pentagonal aperture. A part of the pentagonal aperture is formed by one aperture edge 122g of the diaphragm blade 122 that moves a large distance at a low speed in the first direction and the two aperture edges 121m and 121n of the diaphragm blade 121 that moves a large distance at a high speed in the first direction. The remaining part of the pentagonal aperture is formed by the two aperture edges 123m and 123n of the diaphragm blade 123. In the range from the specific aperture value (FIG. 7D) to the closed aperture (FIG. 7F), the aperture is formed by the aperture edges 121m, 121n, 121o, 123m, and 123n of the diaphragm blade 121 that moves a large movement distance at a high speed and the diaphragm blade 123 that moves in the opposite direction.

According to the present invention, the movement distances of the diaphragm blades can be reduced, whereby a small aperture unit can be obtained.

As described above, according to the present invention, a plurality of diaphragm blades can be moved so as to form a polygonal aperture without moving the diaphragm blades by large distances, whereby the size of the aperture unit can be reduced.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-241133 filed Oct. 20, 2009, which is hereby incorporated by reference herein in its entirety.

What is claimed is:

1. An aperture unit comprising:

three or more diaphragm blades;

a base plate that supports the three or more diaphragm blades such that the blades are linearly movable in directions perpendicular to an optical axis;

a drive lever connected to the blades, the drive lever being rotatable; and an aperture motor that rotates the drive lever, wherein two or more of the blades that linearly move in a first direction have aperture edges having different shapes, and a polygonal aperture is formed by the aperture edges of the two or more blades and an aperture edge of at least one of the blades that linearly moves in a second direction opposite to the first direction, wherein movement distances and movement speeds of the two or more blades that move in the first direction from an open aperture state to a closed aperture state are respectively different from one another, and among the two or more blades, blades that move large distances at high speeds have aperture edges that are parallel to aperture edges of blades that move small distances at low speeds, wherein, in a range from a reference aperture value to a specific aperture value, the polygonal aperture is formed by aperture edges of the two or more blades that linearly move in the first direction and an aperture edge of the at least one blade that linearly moves in the second direction, the reference aperture value being an aperture value at which a polygonal aperture is formed only by the aperture edges of the blades when the blades are moved from the open aperture state, and wherein, in a range from the specific aperture value to the closed aperture state, an aperture is formed by aperture edges of two blades that move in opposite directions.

2. The aperture unit according to claim 1, further comprising two blades that move in the first direction and two blades that move in the second direction opposite to the first direction, and wherein, in the range from the reference aperture value to the specific aperture value, a hexagonal aperture is formed by one aperture edge of one of the two blades that moves a small distance at a low speed in the first direction, two aperture edges of the other of the two blades that moves a large distance at a high speed in the first direction, one aperture edge of one of the two blades that moves a small distance at a low speed in the second direction, and two aperture edges of the other of the two blades that moves a large distance at a high speed in the second direction, and wherein, in the range from the specific aperture value to the closed aperture state, an aperture is formed by aperture edges of the two blades that move large distances at high speeds in opposite directions.

3. The aperture unit according to claim 1, further comprising two blades that move in the first direction and two blades that move in the second direction opposite to the first direction, and wherein, in the range from the reference aperture value to the specific aperture value, an octagonal aperture is formed by two aperture edges of one of the two blades that moves a small distance at a low speed in the first direction, two aperture edges of the other of the two blades that moves a large distance at a high speed in the first direction, two aperture edges of one of the two blades that moves a small distance at a low speed in the second direction, and two aperture edges of the other of the two blades that moves a large distance at a high speed in the second direction, and wherein, in the range from the specific aperture value to the closed aperture state, an aperture is formed by aperture edges of the two blades that move large distances at high speeds in opposite directions.

4. The aperture unit according to claim 1, wherein the aperture unit includes two diaphragm blades that move in the first direction and one diaphragm blade that moves in the second direction opposite to the first direction, and wherein, in the range from the reference aperture value to the specific aperture value, a pentagonal aperture is formed by one aperture edge of one of the two blades that moves a small distance at a low speed in the first direction, two aperture edges of the other of the two blades that moves a large distance at a high speed in the first direction, two aperture edges of the blade that moves in the second direction, and wherein, in the range from the specific aperture value to the closed aperture state, an aperture is formed by an aperture edge of the blade that moves a large distance at a high speed in the first direction and an aperture edge of the blade that moves in the second direction.

5. A lens barrel comprising:

the aperture unit according to claim 1; and an optical system, wherein the aperture unit is disposed in an optical path of the optical system.

6. An image pickup apparatus comprising:

the lens barrel according to claim 5; and a vibration sensor configured to detect a change in orientations of the image pickup apparatus.

* * * * *